US007991431B2

United States Patent
Kawamoto

(10) Patent No.: US 7,991,431 B2
(45) Date of Patent: *Aug. 2, 2011

(54) INFORMATION PROCESSING APPARATUS AND METHOD, INFORMATION PROCESSING SYSTEM, AND TRANSMISSION MEDIUM

(75) Inventor: Yoji Kawamoto, Tokyo (JP)

(73) Assignee: MobileMedia Ideas LLC, Chevy Chase, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/526,017

(22) Filed: Sep. 25, 2006

(65) Prior Publication Data

US 2007/0015493 A1    Jan. 18, 2007

Related U.S. Application Data

(63) Continuation of application No. 09/126,007, filed on Jul. 29, 1998, now Pat. No. 7,190,971.

(30) Foreign Application Priority Data

Jul. 29, 1997  (JP) .................................. P09-203055

(51) Int. Cl.
*H04M 1/00*  (2006.01)

(52) U.S. Cl. ................... 455/556.1; 455/3.01; 455/3.03; 455/3.05; 455/3.06; 455/66.1; 455/344; 709/217; 709/219

(58) Field of Classification Search ........ 455/3.01–3.06, 455/414.3, 414.4, 556.1, 66.1, 344; 709/217, 709/219
See application file for complete search history.

(56) References Cited

U.S. PATENT DOCUMENTS

| 4,718,106 | A |   | 1/1988  | Weinblatt |
| 4,887,308 | A | * | 12/1989 | Dutton ....................... 455/156.1 |
| 5,063,610 | A |   | 11/1991 | Alwadish |
| 5,119,503 | A |   | 6/1992  | Mankovitz |
| 5,119,507 | A |   | 6/1992  | Mankovitz |
| 5,134,719 | A |   | 7/1992  | Mankovitz |
| 5,161,251 | A |   | 11/1992 | Mankovitz |
| 5,263,199 | A |   | 11/1993 | Barnes et al. |
| 5,408,686 | A |   | 4/1995  | Mankovitz |

(Continued)

FOREIGN PATENT DOCUMENTS

JP            60-086932        5/1985

(Continued)

OTHER PUBLICATIONS

Asif Ghias, et al.,"Query by Humming Musical Information Retrieval in an Audio Database", Proceedings of the Third ACM International Conference on Multimedia, Jan. 1995, 6 Pages.

(Continued)

*Primary Examiner* — Raymond S Dean
(74) *Attorney, Agent, or Firm* — Proskauer

(57) ABSTRACT

When a user gets interested in some music he/she listens to somewhere, for example, in a coffee shop, the user records that music in a memory provided in a portable terminal. A processor reads the information stored in the memory and performs a predetermined process on it. The resultant information is stored on a storage device. The information stored on the storage device is then transferred to a server via a communication device. The server searches the database for the title of the music corresponding to the received information, and returns the result to the terminal. Thus, the user can easily get information about the title of the music.

17 Claims, 8 Drawing Sheets

U.S. PATENT DOCUMENTS

| | | | |
|---|---|---|---|
| 5,457,815 A | 10/1995 | Morewitz, II | |
| 5,497,372 A * | 3/1996 | Nankoh et al. | 370/480 |
| 5,526,284 A | 6/1996 | Mankovitz | |
| 5,548,822 A | 8/1996 | Yogo | |
| 5,561,849 A | 10/1996 | Mankovitz | |
| 5,585,838 A | 12/1996 | Lawier et al. | |
| 5,604,744 A | 2/1997 | Andersson et al. | |
| 5,613,202 A | 3/1997 | Ishida et al. | |
| 5,686,954 A | 11/1997 | Yoshinobu et al. | |
| 5,703,795 A | 12/1997 | Mankovitz | |
| 5,734,720 A | 3/1998 | Salganicoff | |
| 5,739,451 A | 4/1998 | Winksy et al. | |
| 5,751,672 A | 5/1998 | Yankowski | |
| 5,758,257 A | 5/1998 | Herz et al. | |
| 5,771,453 A | 6/1998 | Haartsen | |
| 5,774,664 A | 6/1998 | Hidary et al. | |
| 5,806,005 A | 9/1998 | Hull et al. | |
| 5,841,979 A | 11/1998 | Schulhof et al. | |
| 5,898,910 A * | 4/1999 | Miyake et al. | 455/186.1 |
| 5,931,901 A * | 8/1999 | Wolfe et al. | 709/206 |
| 5,948,041 A | 9/1999 | Abo et al. | |
| 5,949,492 A | 9/1999 | Mankovitz | |
| 5,950,125 A | 9/1999 | Buhrmann et al. | |
| 5,977,964 A | 11/1999 | Williams et al. | |
| 5,987,525 A | 11/1999 | Roberts et al. | |
| 5,991,737 A | 11/1999 | Chen | |
| 6,005,561 A | 12/1999 | Hawkins et al. | |
| 6,005,936 A | 12/1999 | Shimizu et al. | |
| 6,031,795 A | 2/2000 | Wehmeyer | |
| 6,034,925 A | 3/2000 | Wehmeyer | |
| 6,052,145 A | 4/2000 | Macrae et al. | |
| 6,088,455 A | 7/2000 | Logan et al. | |
| 6,094,221 A | 7/2000 | Andersion | |
| 6,100,884 A | 8/2000 | Tomita et al. | |
| 6,105,134 A | 8/2000 | Pinder et al. | |
| 6,124,854 A | 9/2000 | Sartain et al. | |
| 6,199,076 B1 | 3/2001 | Logan et al. | |
| RE37,131 E | 4/2001 | Mankovitz | |
| 6,246,767 B1 | 6/2001 | Akins, III et al. | |
| 6,253,069 B1 | 6/2001 | Mankovitz | |
| 6,268,849 B1 | 7/2001 | Boyer et al. | |
| 6,288,991 B1 | 9/2001 | Kajiyama et al. | |
| 6,298,482 B1 | 10/2001 | Seidman et al. | |
| 6,300,880 B1 | 10/2001 | Sitnik | |
| 6,314,577 B1 | 11/2001 | Pocock | |
| 6,356,754 B1 | 3/2002 | Onozawa et al. | |
| 6,453,339 B1 | 9/2002 | Schultz et al. | |
| 6,505,160 B1 * | 1/2003 | Levy et al. | 704/270 |
| 6,578,047 B1 | 6/2003 | Deguchi | |
| RE38,600 E | 9/2004 | Mankovitz | |
| 7,190,971 B1 * | 3/2007 | Kawamoto | 455/556.1 |
| 7,197,495 B2 | 3/2007 | Deguchi et al. | |
| 7,200,586 B1 | 4/2007 | Deguchi et al. | |
| 2002/0028665 A1 | 3/2002 | Mankovitz | |
| 2003/0021441 A1 * | 1/2003 | Levy et al. | 382/100 |
| 2005/0043018 A1 | 2/2005 | Kawamoto | |
| 2006/0223507 A1 * | 10/2006 | Kawamoto | 455/414.1 |

FOREIGN PATENT DOCUMENTS

| | | |
|---|---|---|
| JP | 61-228795 | 10/1986 |
| JP | 62-47395 | 10/1987 |
| JP | 62-267973 | 11/1987 |
| JP | 63-24786 | 2/1988 |
| JP | 4-13184 | 1/1992 |
| JP | 4-40026 | 2/1992 |
| JP | 06-044752 | 2/1994 |
| JP | 06-070292 | 3/1994 |
| JP | 6-274157 | 9/1994 |
| JP | 7-7483 | 1/1995 |
| JP | 07-500715 | 1/1995 |
| JP | 7-36478 | 2/1995 |
| JP | 7-121556 | 5/1995 |
| JP | 08-032538 | 2/1996 |
| JP | 08-037506 | 2/1996 |
| JP | 08-097784 | 4/1996 |
| JP | 8-123818 | 5/1996 |
| JP | 08-127187 | 5/1996 |
| JP | 08-138357 | 5/1996 |
| JP | 08-147948 | 6/1996 |
| JP | 08-306124 | 11/1996 |
| JP | 08-306170 | 11/1996 |
| JP | 8-307374 | 11/1996 |
| JP | 09-102827 | 4/1997 |
| JP | 9-503636 | 4/1997 |
| JP | 09-138691 | 5/1997 |
| JP | 10-116472 | 5/1998 |
| JP | 10-163988 | 6/1998 |

OTHER PUBLICATIONS

Tetsuya Kageyama, et al., "Melody Search—Retrieving Music DB by Humming", Information Processing Society of Japan, No. 43, Sep. 24, 1991, 2 Pages.

Yasuhiro Tsuji, et al., "Local Patterns of a Melody and Its Applications to Retrieval by Sensitivity Words", Institute of Electronics, Information and Communication Engineers Technical Study Reports SP96-122 to 126, vol. 96, No. 565, Mar. 6, 1997, pp. 17-24 with English Abstract.

Tetsuya Kageyama, et al., "A Melody Retrieval Method With Hummed Melody", Institute of Electronics, Information and Communication Engineers Article Magazine, vol. J77-D-II, No. 8, Aug. 25, 1994, pp. 1543-1551.

Tomonori Kaizuka, et al., "Music Retrieval System Using Keys Providing the Melody Information of a Voice and the Text Information of a Song", Information Processing Society of Japan, No. 54, Mar. 12, 1997, pp. 2-277 and 2-278.

U.S. Appl. No. 11/672,078, filed Feb. 7, 2007, Kawamoto.

Ryuji Kubozono at al., "A Study on 'Indexed-by-Music' Information Retrieval System", Proceedings of the 1995 IEICE General Conference, p. 290, Mar. 27-30, 1995 (with Translation).

Nippon Broadcasting System, Inc. & Rikei Corporation, "Record Room New Database Management System", Broadcasting Technologies, Magazine Specializing in Transmission and Reception Technologies, 1991 vol. 44, No. 9, Hohsoh-Gljutsu (Broadcasting Technologies) (with Translation).

Rodger, J. McNab, et al., "Towards the Digital Music Library: Tune Retrieval from Acoustic Input", Proceedings of the first ACM international conference on Digital libraries, Mar. 20-23, 1996, pp. 11-18.

Toshikazu Fukushima, et al., "Multimedia Retrieval Technology", NEC Information Technology Research Laboratories, C&C Research Laboratories, vol. 48, No. 1, Jan. 25, 1995, pp. 241-244 (with English Abstract).

ISO 3901, International Standard recording Code (ISRC), First Edition, Nov. 1, 1986, 1-4.

NIKKEI Electronics, No. 683, Feb. 24, 1997, pp. 149-162.

NIKKEI Electronics, No. 684, Mar. 10, 1997, pp. 153-168.

W. Bender et al., "Techniques for Data Hiding," IBM Systems Journal, vol. 35, No. 3 & 4, 1996, pp. 313-336.

ConneXus Corporation, Press Release: "CD Receives Patent for Interactive Technology; Government Awards Process Patent for CD's Revolutionary Broadcast Interface System," Aug. 1, 2000, PR Newswire.

Tomkins, Michael, "Digital Photography News Archivel", Jun. 1998, pp. 1-10.

Pentcheff, Dean, "Re: Time Stamp on video recording", LISTSERV service at SUNET, Mar. 16, 1996, pp. 1-2.

Yu, Raymond, "Digital Cameras: The Basics", Dec. 13, 1997, pp. 1-6.

The Korean Hearld (hereinafter "KH" (Internet-only TV station begins service, The Korean Herald (XBF), Jul. 10, 1997, p. 7)), and further in view of Yoshinobu et al. (U.S. No. 5,686,954).

MPR (National Public Radio, "talk of the Nation Science Friday with Ira Flatow", posted in 1998, 9 pages, retrieved from http//web.archive.org/web/1998 1206192442/www.npr.org/programs/scifri/on Jan. 13, 2005).

Query by Humming Musical Information Retrieval in an Audio Database Ghias et al., 1995.

Hohsu-Gijutsu "Broadcasting Technologies", Magazine Specializing in Transmission and Reception Technologies, vol. 44, No. 9, 1991,6 pages (with English translation).

* cited by examiner

INFORMATION PROCESSING APPARATUS AND METHOD, INFORMATION PROCESSING SYSTEM, AND TRANSMISSION MEDIUM

CROSS-REFERENCE TO RELATED APPLICATIONS

The present application is a divisional application of Ser. No. 09/126,007 filed Jul. 29, 1998 (now allowed) and claims priority to Japanese Application No. JP 09-203055 filed Jul. 29, 1997.

BACKGROUND OF THE INVENTION

1. Field of the Invention

The present invention relates to an information processing method and apparatus, an information processing system, and a transmission medium, and more particularly, to an information processing method, apparatus, system, and transmission medium that allow a user to store information user gets interested in regardless of where the user is and that allow the user to acquire information associated with the stored information on the basis of the stored information.

2. Description of the Related Art

When one watches a television program or listens to a radio program, he/she often wants to know the title, the name of the singer, or other information about music being played in the program.

In the FM radio broadcasting, a "visual radio" is known in the art in which available spaces between the carrier frequencies are used to transmit textual information about the music being broadcasted in the main programs so that listeners can get the information about the music. In the case of ground wave television broadcasting, the listeners can download the information about the music being broadcasted, using an intercast.

However, different terminals depending on the broadcasts are needed to get information about the music, such as the title or the singer's name. This limits the situation or environment in which the user can get the information. For example, it is practically impossible to get associated information when the user is outdoor.

In view of the above, the object of the present invention is to provide a technique to quickly and easily acquire associated information.

SUMMARY OF THE INVENTION

According to an aspect of the present invention, there is provided an information processing apparatus comprising: capture means for capturing information; memory means for storing information captured via the capture means; acquisition means for acquiring information associated with the information stored in the memory means on the basis of the information stored in the memory means; and display means for displaying the information acquired via the acquisition means.

According to another aspect of the present invention, there is provided an information processing method comprising the steps of: capturing information; storing the information captured in the capture step; acquiring associated information on the basis of the information stored in said storage step; and displaying the information acquired in said acquisition step.

According to still another aspect of the present invention, there is provided a transmission medium for transmitting a program comprising: capturing information; storing the information captured in the capture step; acquiring associated information on the basis of the information stored in said storage step; and displaying the information acquired in said acquisition step.

According to still another aspect of the present invention, there is provided an information processing apparatus comprising: reception means for receiving information from a portable type information processing apparatus; judgment means for judging whether the information received via the reception means includes an identification code in a predetermined form associated with the information; and transmission means for transmitting information associated with the information indicated by the identification code to the portable type information processing apparatus, depending on the judgment result made by the judgment means.

According to still another aspect of the present invention, there is provided an information processing method comprising the steps of: receiving information from a portable type information processing apparatus; judging whether the information received in the reception step includes an identification code in a predetermined form associated with the information; and transmitting information associated with the information indicated by the identification code to the portable type information processing apparatus, depending on the judgment result made in the judgment step.

According to still another aspect of the present invention there is provided a transmission medium for transmitting a program comprising the steps of: receiving information from a portable type information processing apparatus; judging whether the information received in the reception step includes an identification code in a predetermined form associated with the information; and transmitting information associated with the information indicated by the identification code to the portable type information processing apparatus, depending on the judgment result made in the judgment step.

According to still another aspect of the present invention, there is provided an information processing system including a first and second information processing apparatus, wherein said first information processing apparatus comprises: capture means for capturing information; memory means for storing information captured via the capture means; acquisition means for acquiring information associated with the information stored in the memory means on the basis of the information stored in the memory means; and display means for displaying the information acquired via the acquisition means; and the second information processing apparatus comprises: reception means for receiving information from the first information processing apparatus; judgment means for judging whether the information received via the reception means includes an identification code in a predetermined form associated with the information; and transmission means for transmitting information associated with the information indicated by the identification code to the first information processing apparatus, depending on the judgment result made by the judgment means.

According to still another aspect of the present invention, there is provided an information processing method characterized in that a first information processing apparatus performs a process comprising the steps of: capturing information; storing the information captured in the capture step; acquiring associated information on the basis of the information stored in the storage step; and displaying the information acquired in the acquisition step; and a second information processing apparatus performs a process comprising the steps of: receiving information from the first information processing apparatus; judging whether the information received in the reception step includes an identification code in a predetermined form associated with the information; and transmitting information associated with the information indicated by the identification code to the first information processing apparatus, depending on the judgment result made in the judgment step.

According to still another aspect of the present invention, there is provided a transmission medium for transmitting a program in accordance with which the first information processing apparatus performs a process comprising the steps of: capturing information; storing the information captured in the capture step; acquiring associated information on the basis of the information stored in the storage step; and displaying the information acquired in the acquisition step; and the second information processing apparatus performs a process comprising the steps of: receiving information from the first information processing apparatus; judging whether the information received in the reception step includes an identification code in a predetermined form associated with the information; and transmitting information associated with the information indicated by the identification code to the first information processing apparatus, depending on the judgment result made in the judgment step.

In the portable type information processing apparatus according to one aspect of the invention, the information processing method according to one aspect of the invention, and the transmission medium according to one aspect of the invention, information is captured and the captured information is stored so that information associated with the stored information can be acquired on the basis of the stored information and the acquired information is displayed.

In the information processing apparatus according to one aspect of the invention, the information processing method according to one aspect of the invention, and the transmission medium according to one aspect of the invention, information is received from a portable type information apparatus and it is judged whether the received information includes an identification code in a predetermined form associated with the information. Depending on the judgment result, information associated with the information indicated by the identification code is transmitted to the portable type information processing apparatus.

In the information processing system according to one aspect of the invention, the information processing method according to one aspect of the present invention, and the transmission medium according to one aspect of the invention, the first information processing apparatus performs the process comprising the steps of: capturing information; storing the captured information: acquiring associated information on the basis of the stored information; and displaying the acquired information; and the second information processing apparatus performs the process comprising the steps of: receiving information from the first information processing apparatus; judging whether the received information includes an identification code in a predetermined form associated with the information; and transmitting information associated with the information indicated by the identification code to the first information processing apparatus, depending on the judgment result.

DESCRIPTION OF THE PREFERRED EMBODIMENTS

Figure 1:
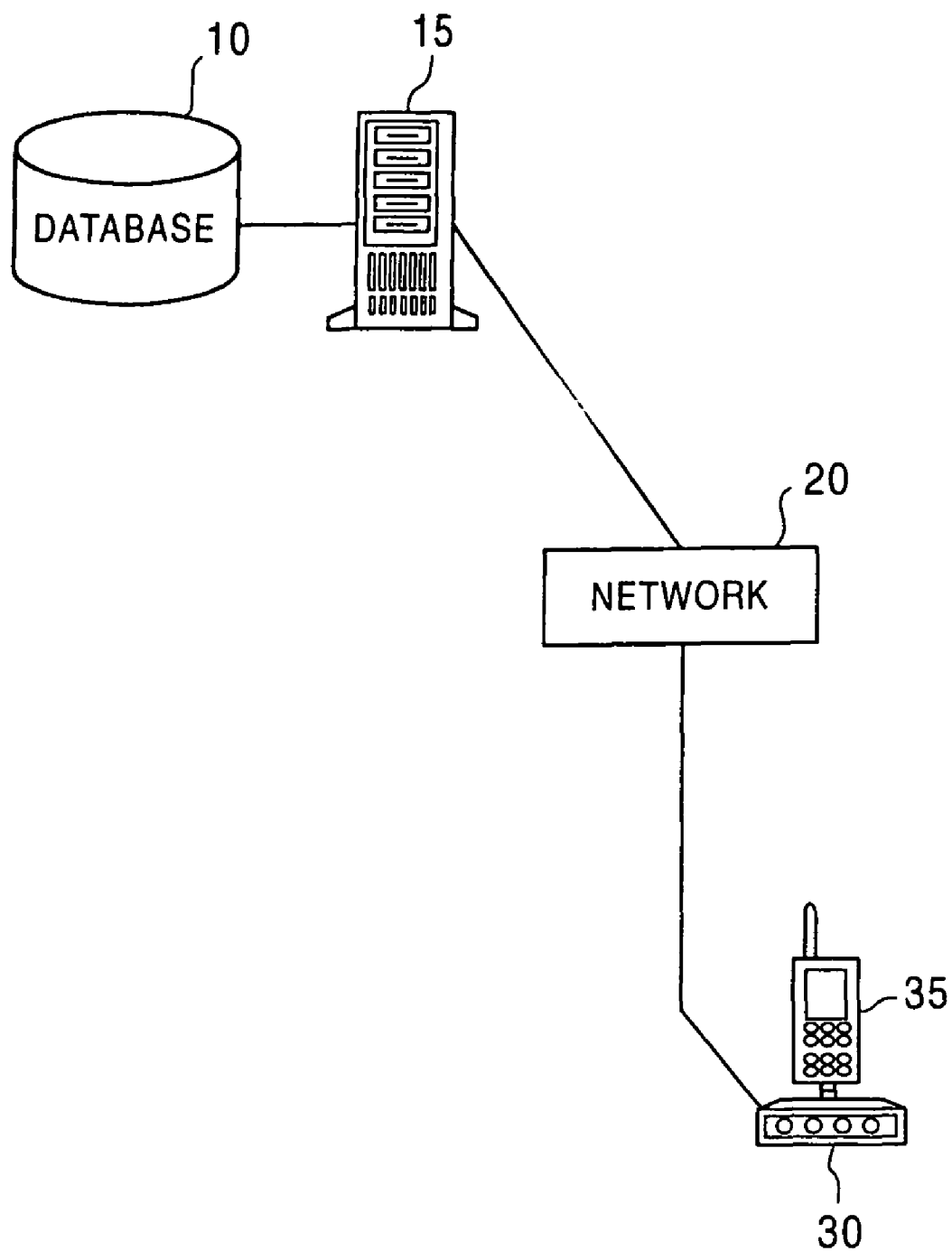
FIG. 1 is a schematic diagram illustrating an embodiment of an information processing system according to the present invention.

Before describing the preferred embodiments of the invention, a description of the aspects of the invention is first given in which an example of element corresponding to each means is described in parentheses following the description of the means. However, it is not intended to limit the means to those described. Herein, the term "system" is used to describe a total system including a plurality of apparatus, devices, and/or means.

The portable type, information processing apparatus according to one aspect of the invention includes capture means (for example step S11 in FIG. 3) for capturing information; memory means (for example step S14 in FIG. 3) for storing information captured via the capture means; acquisition means (for example step S21 in FIG. 5) for acquiring information associated with the information stored in the memory means on the basis of the information stored in the memory means; and display means (for example step S24 in FIG. 5) for displaying the information acquired via the acquisition means.

The acquisition means of the portable type information processing apparatus according to one aspect of the invention includes transmission means (for example step S21 in FIG. 5) for transmitting the information stored in the memory means to another information processing apparatus; and reception means (for example step S24 in FIG. 5) for receiving the associated information from another information processing apparatus described above.

The acquisition means of the portable type information processing apparatus according to one aspect of the invention, includes storage means (for example information storage device 61 shown in FIG. 8) for storing the acquired information.

The information processing apparatus according to one aspect of the invention, includes reception means (for example step S21 in FIG. 5) for receiving information from the portable type information processing apparatus; judgment means (for example step S22 in FIG. 5) for judging whether the information received via the reception means includes an identification code in a predetermined form associated with the information; and transmission means (for example step S29 in FIG. 5) for transmitting information associated with the information indicated by the identification code to the portable type information processing apparatus, depending on the judgment result made by the judgment means.

In the information processing system according to one aspect of the invention, the first information processing apparatus comprises: capture means (for example step S11 in FIG. 3) for capturing information; memory means (for example step S14 in FIG. 3) for storing information captured via the capture means; acquisition means (for example step S21 in FIG. 5) for acquiring information associated with the information stored in the memory means on the basis of the information stored in the memory means; and display means (for example step S24 in FIG. 5) for displaying the information acquired via the acquisition means; and the second information processing apparatus comprises: reception means (for example step S21 in FIG. 5) for receiving information from the first information processing apparatus; judgment means (for example step S22 in FIG. 5) for judging whether the information received via the reception means includes an identification code in a predetermined form associated with the information; and transmission means (for example step S29 in FIG. 5) for transmitting information associated with the information indicated by the identification code to the first information processing apparatus, depending on the judgment result made by the judgment means.

FIG. 1 is a schematic diagram illustrating the construction of an information system according to the present invention. A server 15 includes a database 10 storing detailed information. A communication device 30 is an apparatus by which a terminal 35 and the server 15 can communicate with each other via a network 20 including telephone lines or private lines.

In the case where a PHS (Personal Handy-Phone System) or a PDC (Personal Digital Cellular) or the like is employed to realize the terminal 35, the terminal 35 itself has the communication capability and thus the communication device 30 is not necessary.

Figure 2:
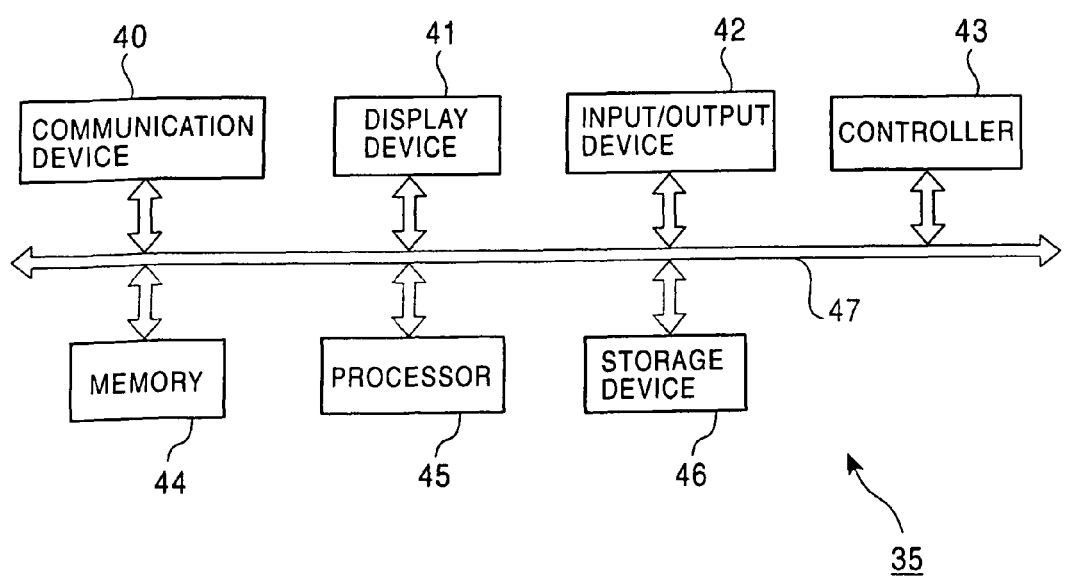
FIG. 2 is a block diagram illustrating the construction of the terminal shown in FIG. 1.

FIG. 2 is a block diagram illustrating the construction of the terminal 35. This terminal 35 includes a communication device 40 that makes it possible for the terminal to directly communicate with the server 15. A display device 41 indicates various kinds of information. An input/output device 42 includes a microphone for inputting music or other information, a loudspeaker for outputting music or other information, and buttons used to operate the terminal 35. A controller 43 controls various elements of the terminal 35 and is realized, for example, with a CPU (Central Processing Unit). A memory 44 is realized, for example, with a RAM (Random Access Memory) and serves to temporarily store information input via the input/output device 42.

A processor 45 includes a filter for reducing noise contained in the information stored in the memory 44 and also includes a circuit for extracting desired data from the information. The information processed by the processor 45 is transferred to a storage device 46. The storage device 46 stores the information received from the processor 45 and also information received via the communication device 40. The storage device 46 may be realized with either a removable storage medium such as a floppy disk or a fixed storage medium. The constituent elements described above are connected to each other via a bus 47.

Figure 3:
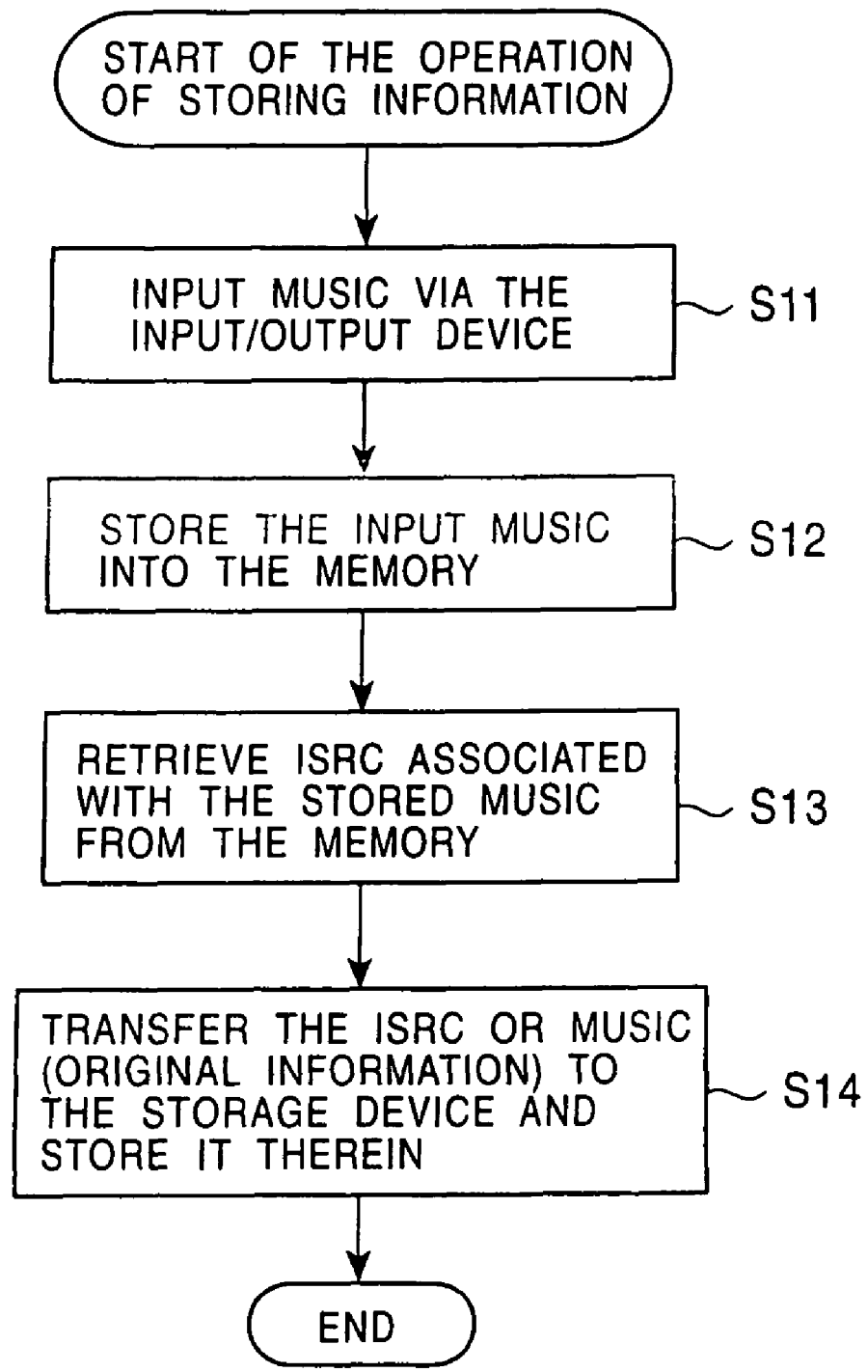
FIG. 3 is a flowchart illustrating the process of storing information.

The operation of the terminal 35 shown in FIG. 2 is described below with reference to the flowchart shown in FIG. 3. We assume herein that a user carrying a terminal 35 happens to hear some music, for example, in a coffee shop and gets interested in that music.

In step S11, the input/output device 42 of the terminal 35 is operated. The input/output device 42 includes a recording button which is pressed by a user to record music and also includes a microphone for inputting music. If this button is pressed in step S11, then music is input via the microphone.

In step S12, the controller 43 records, into the memory 44, the music input via the input/output device 42 when the recording button is being pressed. In such a situation, the music may be directly recorded in the memory 44 or a tune whistled or hummed by the user may be recorded.

In step S13, the processor 45 reads the music data from the memory 44 and performs a predetermined process on it. More specifically, noise included in the music data recorded in the coffee shop is suppressed first. After suppressing the noise, a series of data shown in FIG. 4 is extracted from the music data if such a type of data is included in the music data.

The series of data 51 consists of a plurality of frame 52 each including the same contents. The reason why a plurality of frames 52 including the same contents are incorporated into the music data is because it is impossible to predict when the user records music on the terminal 35 and thus it is required that the data be available whenever music is recorded.

Each frame 52 consists of a starting code 53 and a music identification code 54. The music identification code 54 is a number uniquely assigned to particular music. The starting code 53 indicates the data position at which the music identification code 54 starts. The processor 45 of the terminal 35 detects the starting code 53 from the extracted series of data 51, and then detects the music identification data 54 following that. The detected data is transferred to the storage device 46 and stored thereon.

Figure 4:
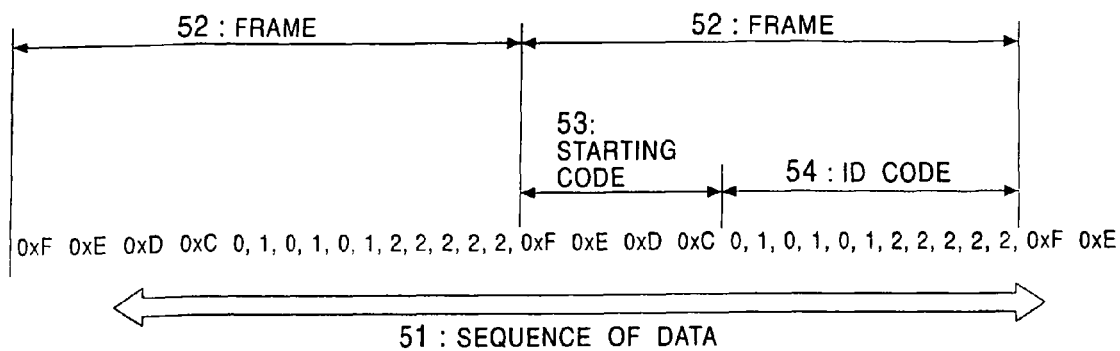
FIG. 4 is a schematic diagram illustrating an example of information incorporated into music.

In the specific example shown in FIG. 4, the starting code 53 is 0xFEDC and the music identification code 54 is 01010122222.

The series of data 51 can be incorporated into music using a data hiding technique. The data hiding technique is reviewed, for example, in Nikkei Electronics, No. 2-24 (1997), pp. 149-162 and also in No. 3-10, (1997), pp. 153-168. This technique has some variations depending on whether the data is hidden using phase, echo, or sound difference. The processor 45 should include a circuit adapted to the specific data hiding technique so that the series of data 51 incorporated in music is corrected extracted.

If the data hiding technique is used, it is possible to incorporate all information representing the title of music, the name of the singer, the name of the album and other items associated with the music. However, if a great amount of information is incorporated into music, then the music contains a great amount of noise component. This problem can be avoided by limiting the information incorporated in music to only the information identifying the music whereby the music can be retrieved later using that information. For example, the music identification code 54 may be represented in accordance with the ISRC (international Standard Recording Code) established in 1986 (ISO3901). For further information about the ISRC, refer to IS03901 or the ISRC Operation Standard issued by Recording Industry Association of Japan. In the ISRC, a particular code is assigned to each music so that any music can be identified by the ISRC. Each ISRC consists of a string of 12 alphanumeric characters.

Each recording company provides information such as the title, singers name, composer's name, songwriter's name, genre, etc., associated with the ISRC. Therefore, if such information is stored in relation to the ISRC in the database 10 (FIG. 1), then it becomes possible to retrieve detailed information associated with desired music using the ISRC. In the following description, it is assumed that the music identification code 54 is represented by the ISRC.

In the case where an ISRC is detected in step S13, the processor 45 transfers, in step S14, the detected ISRC to the storage device 47 and stores it thereon. On the other hand, if no ISRC is detected in step S13 (that is, if no ISRC is incorporated in music), the processor 45 transfers, in step S14, music to the storage device 47 and stores it thereon. As a result, the music containing no noise or the ISRC is stored in the storage device 46 (hereinafter the information stored in the storage device 46 is referred to as raw information). Information representing the date and time when the above information is stored is extracted from the timer provided in the controller 43. The extracted date/time information is transferred to the storage device 46 and stored thereon together with the raw information. Alternatively, by operating the input/output device 42, the user himself/herself may input information representing the date and time when he/she listened to the music so that the date/time information is stored together with the raw information on the storage device 46.

When the user records music, if the user inputs via the input/output device 42 information about the medium (for example, television, radio, etc.) in which the music is played, then that information is also stored together with the music. Although it is not necessarily required that the user should input this information, the information can also be used to identify the music if it is stored.

Figure 5:
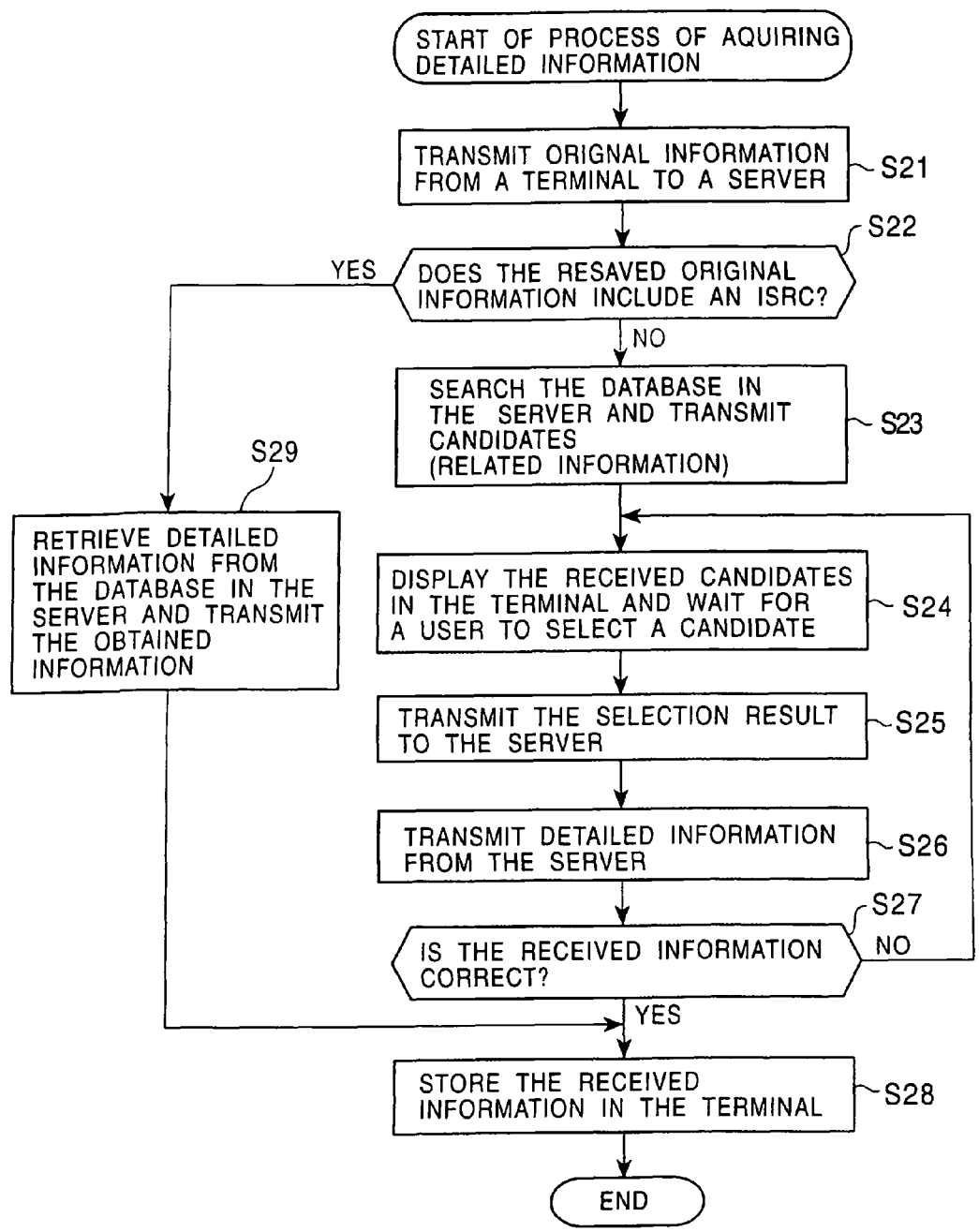
FIG. 5 is a flowchart illustrating the process of acquiring detailed information.

FIG. 5 is a flowchart illustrating the process of acquiring information associated with the music on the basis of the raw information stored in the storage device 46. This process starts when the user operates a particular button of the input/output device 42.

In step S21, the controller 43 of the terminal 35 transmits one of the raw information stored on the storage device 46 from the communication device 40 to the server 15 via the network 20.

In step S22, the server 15 determines whether the received raw information includes an ISRC. If no ISRC is included, that is, if music (melody) itself is received, the process goes to step S23 and music expected to have the same melody as the received music is searched for from the database 10. The information such as the title, the singer's name, etc., associated with the retrieved music is transmitted to the terminal 35.

If the received music includes additional information about the date/time or the media, the information is used in the retrieval. For example, the additional information includes "January 1", "8 a.m.", and "television", then the music file of the database 10 including music broadcasted on television, 8 a.m., January 1 is searched. This causes the search to be narrowed and thus a smaller number of candidates are retrieved in a shorter time.

In step S24, if the controller 43 of the terminal 35 receives candidates from the server 15 via the communication device 40; the controller 43 displays them on the display device 41 and waits for the user to select one of the received candidates via the input/output device 42.

In step S25, the controller 43 transmits a candidate selected by the user to the server 15. In step S26, the server 15 retrieves detailed information corresponding to the received candidate from the database 10 and transmits it to the terminal 35. This detailed information includes the music itself.

In the terminal 35, the received music data is supplied to the input/output device 42 and output via the loudspeaker. In step S27, the user listens to the music and judges whether the music is desired one. The user inputs the judgment result to the terminal via the input/output device 42. The controller 43 performs a proper process depending on the information input via the input/output device 42. More specifically, if the user judges that the music is not the desired one and inputs the judgment result via the input/output device 42, then the controller 43 returns the process to step S24 and again displays the candidates on the display device 41. In this case, the candidate whose detailed information has already been received is displayed in a color different from the color for the other candidates or is not displayed at all.

Steps from 24 to 27 are performed repeatedly until the user gets detailed information associated with the desired music.

On the other hand, if the user judges in step S27 that the music is the desired one and inputs that judgment result via the input/output device 42, then the controller 43 stores the detailed information received on the storage device 46.

If the server 15 determines in step S22 that the received raw information is an ISRC, then the process goes to step S29. In step S29, the server 15 retrieves detailed information corresponding to the received ISRC from the database 10 and transmits it to the terminal 35.

The process then goes to step S28, and the controller 43 stores the received detailed information on the storage device 46. In this case, the title of the music is displayed on the display device 41. The detailed information transmitted from the server 15 to the terminal 35 includes not only music data but also other information such as the title of the music. In the case where only the title of the music is required, only the title may be transmitted.

The above-described process of acquiring the detailed information is started when the user properly operates the input/output device 42. In the case where the storage device 46 includes two or more pieces of raw information, the process from step S21 to step S29 is performed for each raw information and the process is repeated until all pieces of raw information are replaced with the corresponding detailed information.

Figure 6:
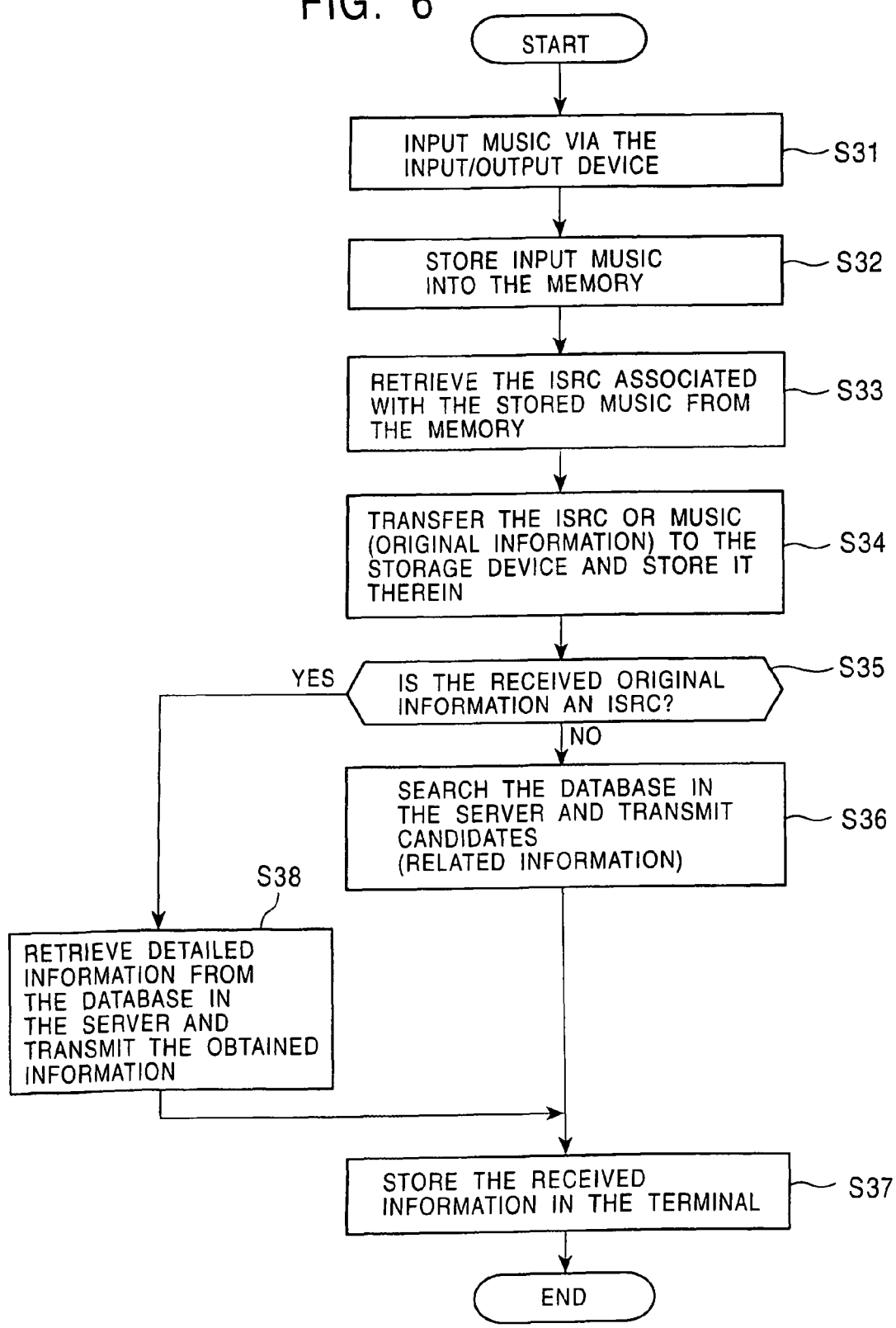
FIG. 6 is a flowchart illustrating another process of storing information.
Figure 7:
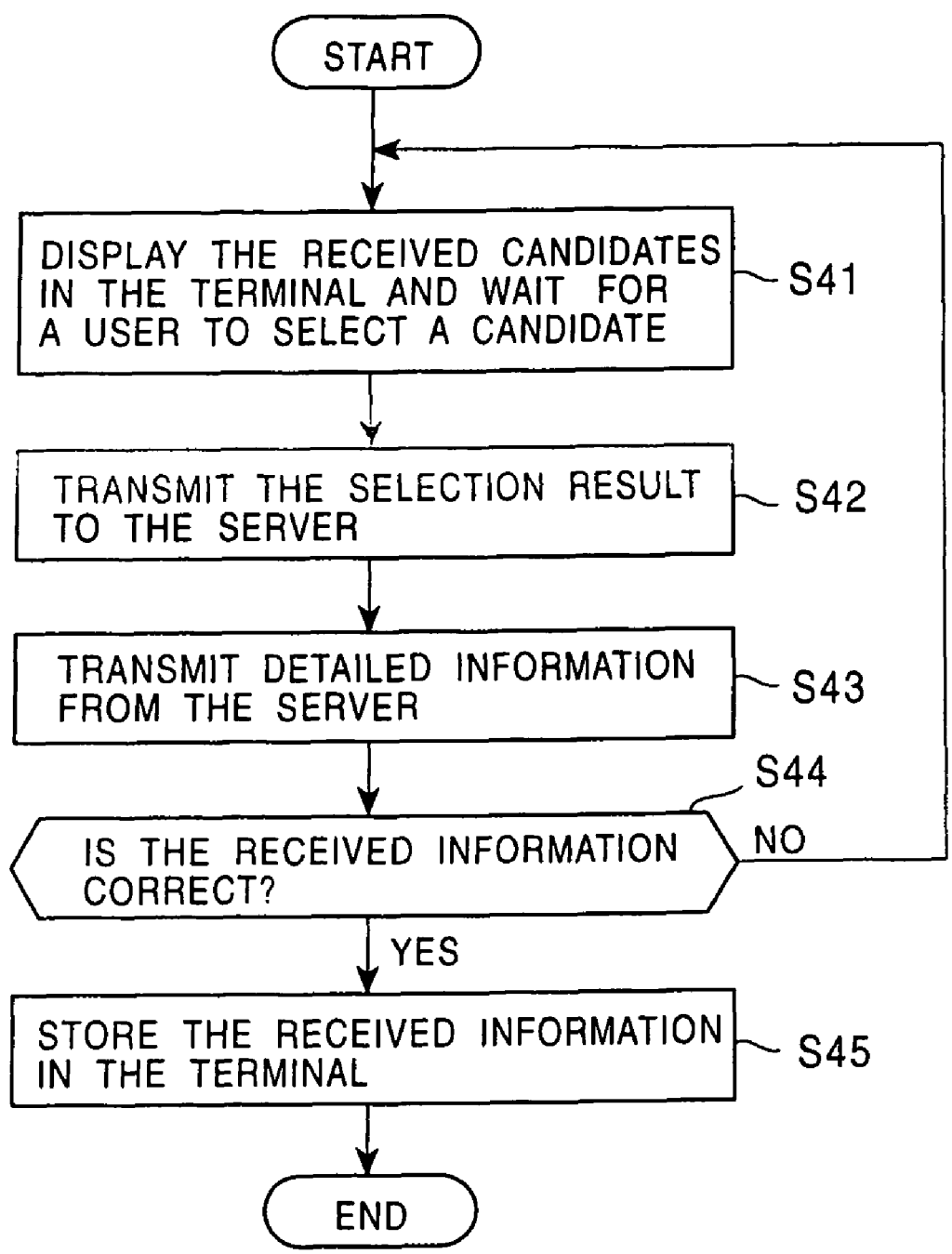
FIG. 7 is a flowchart illustrating another process of acquiring detailed information.

FIGS. 6 and 7 are flowcharts illustrating another method of acquiring detailed information. First, in step S31 shown in FIG. 6, the input/output device 42 of the terminal 35 is operated and music is input via it. In step S32, the controller 43 temporarily stores the input music in the memory 44. Then in step S33, the processor 45 reads the music from the memory 44 and suppresses noise contained in it. Furthermore, the processor 45 extracts an ISRC therefrom. In step S34, the controller transmits the extracted ISRC or the music (raw information) itself to the server 15.

In step S35, the server 15 determines whether the received raw information includes an ISRC. If no ISRC is included in the received raw information, that is, if music (melody) itself is received, the process goes to step S36 and music expected to have the same melody as the received music is searched for from the database 10. The candidates (associated information) obtained as a result of the retrieval is transmitted to the terminal 35.

In step S37, the controller 43 of the terminal 35 stores all received candidates on the storage device 46.

On the other hand, in the case where the server 15 determines in step S35 that the received raw information includes an ISRC, the process goes to step S38. In step S38, the server 15 retrieves detailed information corresponding to the received ISRC from the database 10 and transmits it to the terminal 35. In the terminal 35, the detailed information received is, in step S37, stored on the storage device 46.

The above-described process from step S31 to S38 is performed each time the user records music.

FIG. 7 is a flowchart illustrating the process of acquiring detailed information from candidates stored on the storage device 46. The user can, at any time when the user wants, operate the input/output device 42 of the terminal 35 so as to start the following process. If the command to start the process is given, the controller 43 of the terminal 35 retrieves candidates from the storage device 46. The controller 43 displays the retrieved candidates on the display device 41 and waits for the user to select one of them via the input/output device 42. Steps from S42 to S45 following the above process are similar to those from S25 to S28 shown in FIG. 5, and thus they are not described here in further detail.

Although in the above-described embodiments communication between the terminal 16 and the server 16 is performed via the network 20, communication may also be performed in any another way. Furthermore, instead of the ISRC system, information incorporated into music may also be represented by any other code system.

Figure 8:
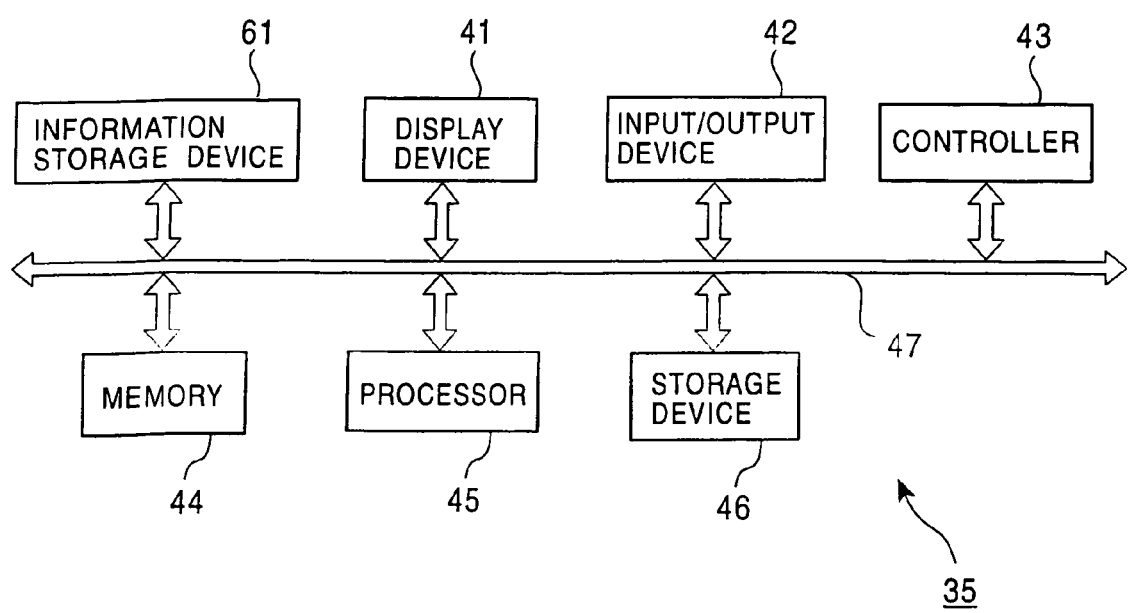
FIG. 8 is a block diagram illustrating another example of the construction of the terminal shown in FIG. 1.

FIG. 8 is a block diagram illustrating another example of the construction of the terminal. This construction is similar to that shown in FIG. 2 except that the communication device 40 is replaced with an information storage device 61. The information storage device 61 stores detailed information associated with music. Therefore, it is possible to get detailed information by searching the information storage device 61 without having to communicate with the server 15. The information storage device 61 may be realized using, for example, an IC card that may be removably attached to the terminal 35. A plurality of information storage devices may be prepared so that each information storage device includes detailed information categorized by singers, genre, etc. Therefore, it is possible to get detailed information in any desired category by attaching a proper card to the terminal. The information stored in the information storage device 61 may be updated via the network 20 or other communication media at proper intervals such as every week, every month, etc.

The terminal 35 shown in FIG. 2 or 8 may further have the capability of giving a notice to the user if the same music is recorded twice or more times on the storage device 46. This capability allows the user to find his/her favorite music.

Although in the embodiments described above it is assumed that the information recorded on the terminal 35 is music, the present invention may also be applied to any other type of information.

A program used to perform the above-described process may be stored on a storage medium such as a floppy disk or a CD-ROM and distributed to users. Alternatively, the program may also be distributed to users by transmitting the program via a transmission medium such as a communication network thereby storing the program on user's hard disk or memory.

As can be understood from the above description, the present invention has various advantages. That is, in the information processing apparatus according to one aspect of the invention, the information processing method according to one aspect of the invention, and the communication medium according to one aspect of the invention, the user can acquire information associated with the information stored by the user. This allows the user to easily and quickly obtain desired information.

In the information processing apparatus according to one aspect of the invention, the information processing method according to one aspect of the invention, and the communication medium according to one aspect of the invention, the information stored by the user on the portable type information processing apparatus is transmitted to another information processing device, which in turn returns information associated with the received information to the portable type information processing apparatus. This allows the user to easily and quickly to obtain desired information.

In the information processing system according to one aspect of the invention, the information processing method according to one aspect of the invention, and the communication medium according to one aspect of the invention, the second information processing apparatus retrieves the information associated with the information stored by the user on the first information processing apparatus, and transmits the resultant information to the first information processing apparatus. This allows the user to easily and quickly to obtain desired information.

The invention claimed is:

1. An information processing apparatus, comprising:
a capture unit configured to capture at least a portion of audio content broadcast from a broadcast source;
a memory configured to store the at least a portion of audio content captured via said capture unit;
a transmitting unit configured to transmit the at least a portion of audio content stored in said memory to a remote server;
an acquisition unit configured to acquire, from the remote server, information associated with the at least a portion of audio content stored in said memory on the basis of the at least a portion of audio content transmitted by said transmitting unit, the acquired information being associated with the content; and
a display configured to display the information acquired via said acquisition unit wherein the acquired information comprises at least one of: a title, a name of an artist, a name of an album, and a composer's name.

2. An information processing apparatus, comprising:
means for capturing at least a portion of audio content broadcast from a broadcast source;
means for storing the at least a portion of audio content captured via said means for capturing;
means for transmitting the at least a portion of audio content stored in said means for storing to a remote server;
means for acquiring, from the remote server, information associated with the at least a portion of audio content stored in said means for storing on the basis of the at least a portion of audio content transmitted by said means for transmitting, the acquired information being associated with the content; and
means for displaying the information acquired via said means for acquiring wherein the acquired information comprises at least one of: a title, a name of an artist, a name of an album, and a composer's name.

3. An information processing method, comprising:
capturing at least a portion of audio content broadcast from a broadcast source;
storing the captured at least a portion of audio content in a memory;
transmitting the at least a portion of audio content stored in the memory to a remote server;
acquiring, from the remote server, information associated with the at least a portion of audio content stored in said memory based on the at least a portion of audio content transmitted, the acquired information being associated with the content; and
displaying the acquired information at a display wherein the acquired information comprises at least one of: a title, a name of an artist, a name of an album, and a composer's name.

4. The information processing apparatus of claim 1, wherein the capture unit comprises a microphone.

5. The information processing apparatus of claim 1, wherein the acquired information comprises a title.

6. The information processing apparatus of claim 1, wherein the acquired information comprises a name of an artist.

7. The information processing apparatus of claim 1, wherein the acquired information comprises a name of an album.

8. The information processing apparatus of claim 1, wherein the acquired information comprises a composer's name.

9. The information processing apparatus of claim 2, wherein the means for capturing comprises a microphone.

10. The information processing apparatus of claim 2, wherein the acquired information comprises a title.

11. The information processing apparatus of claim 2, wherein the acquired information comprises a name of an artist.

12. The information processing apparatus of claim 2, wherein the acquired information comprises a name of an album.

13. The information processing apparatus of claim 2, wherein the acquired information comprises a composer's name.

14. The information processing method of claim 3, wherein the acquired information comprises a title.

15. The information processing method of claim 3, wherein the acquired information comprises a name of an artist.

16. The information processing method of claim 3, wherein the acquired information comprises a name of an album.

17. The information processing method of claim 3, wherein the acquired information comprises a composer's name.

\* \* \* \* \*